Figure 1:
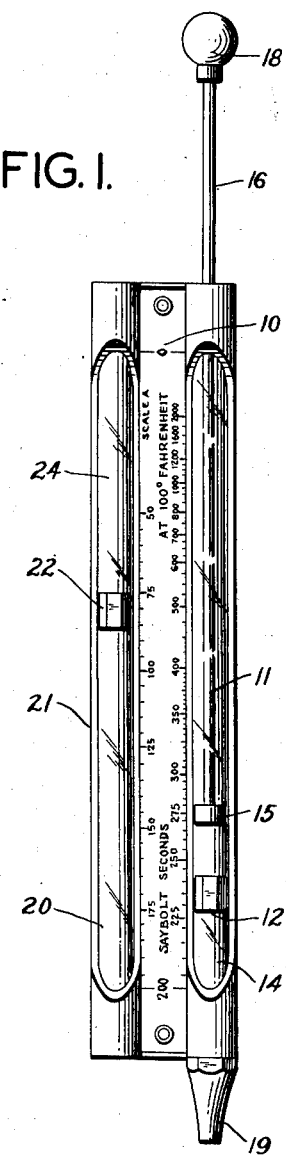

Sept. 9, 1952  L. C. EITZEN  2,609,682
VISCOSITY METER AIR BARRIER
Filed Dec. 18, 1948

INVENTOR
LOUIS C. EITZEN
BY *F. R. Jenkins*
ATTORNEY

Patented Sept. 9, 1952

2,609,682

UNITED STATES PATENT OFFICE 2,609,682

VISCOSITY METER AIR BARRIER

Louis C. Eitzen, New York, N. Y.

Application December 18, 1948, Serial No. 65,993

5 Claims. (Cl. 73—57)

This invention relates to viscosity meters and comparators especially of the type shown in my Patent No. 2,439,287 and in Patent No. 1,511,998 and in particular to reference tubes for standard liquids in the comparators.

The comparators as mentioned above depend for their action on the relative rates of fall of a moving body through two liquids, one of known viscosity and the other the test sample. This is accomplished by an elevation of one end of the instrument having the standard liquid in a closed reference tube.

Heretofore the reference tubes have never been filled completely with the liquid in order to provide an air bubble to permit expansion of the reference liquid with change of temperature. If such an air bubble was not left the reference liquid merely forced its way out past the tube seals to cause leakage and upon contraction, by reduction of temperature, a bubble formed either by vapor from the oil or leakage of air into the tube. The change in length of the column when 200 Saybolt oil in the reference tube amounts to about ¼ inch in about a seven inch tube when the temperature varies between 40° F. and 120° F.

If the falling bodies of the instrument are spherical and small compared to the diameter of their respective tubes the presence of a bubble need not cause serious trouble since the bodies may "roll under the bubble." However, small bodies are frequently invisible in dark crank case oil and the very nature of the instrument requires that the bodies in the test and reference tubes be alike in all respects. To overcome these difficulties light and large falling bodies have been provided such as shown in Patent No. 2,431,378 and applicant's co-pending application Serial Number 46,131, filed August 25, 1948.

When such an instrument employing the light but large falling bodies or elements is inverted or erected and the reference liquid tube contains a bubble, the latter moves counter to the body and must pass it or exert a disturbing and error-producing buoyant action on the body. Of course if the test liquid is lighter than the standard reference liquid the test body may reach the bottom index line just when the reference body passes the bubble thereby making an accurate test impossible.

A number of devices have been proposed for trapping the air bubble in one end of the tube. Most of these depend on some kind of barrier near one end of the tube and provided with capillary openings through which the liquid may pass but which are so small as to retard the passage of a large bubble. These barriers have proved satisfactory when the instrument is carefully handled so that the large air bubble is not broken up into small ones and when the instrument is usually stored in erect position. However when such an instrument is repeatedly inverted and shaken by vibration, during manipulation of the instrument in its use in checking viscosity, the bubbles are broken and in some way pass through the barrier. Once the vapor or air has passed through the barrier it remains in the tube proper to cause the difficulties aforesaid.

An object of the present invention is to provide means for permitting expansion of the reference fluids in such comparators under temperature variations and yet avoid the presence of gas bubbles in the column of liquid.

Another object of the invention is to provide means for effectively sealing the tube of the reference liquid to prevent leakage thereof.

And yet another object of the invention is to provide the aforesaid means in a small space without the need for redesigning the comparator.

The inventive features for attaining these objects are shown in connection with a viscosity comparator comprising a rigid casing sheath having a sight window therein. Within the sheath there is a transparent tube held between cushioned plugs at each end of the sheath, this tube being closed at one end with a fixed stopper and at the other end by a floating stopper bearing against a reference liquid in which a moving body or element is impeded by the liquid. A spring is compressed between the floating stopper and the cushioned plug at the adjacent end to hold the floating stopper against the liquid at all times.

Figure 2:
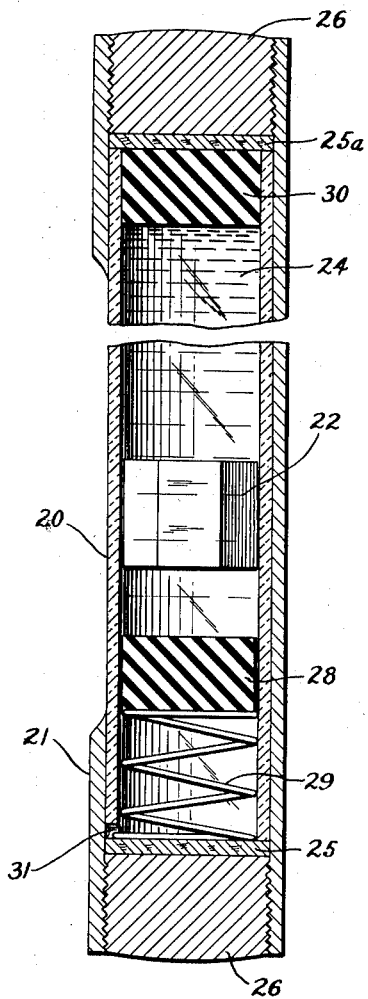

In the accompanying drawing showing, by way of example, one of many possible embodiments of the invention, Fig. 1 is a front elevation of the comparator in erected position, and Fig. 2 is an enlarged vertical cross section of the reference tube.

My viscosity meter comprises a panel 10 provided with appropriate indicia and having an elongated test tube 11 of glass or other suitable transparent material secured on one side marginal portion of the panel and adapted to be filled with liquid 14 to be tested.

A body 12 within the tube is adapted to move or fall therethrough impeded by the liquid which is drawn in by means of a plunger 15 within the tube and operated by a rod 16 having a handle knob 18. A nozzle 19 on the lower end of the test tube and the friction of the plunger against the wall of the tube retain the test liquid. A reference tube 20 is disposed in a protective metal sheath 21 or casing on the opposite marginal portion of the panel.

A body 22 substantially exactly similar to the body 12 and a standard liquid 24 are within the reference tube, the liquid substantially filling the tube. Upper and lower disks 25a and 25 of cork or other suitable material at each end of the tube are interposed between screw plugs 26 in each end of the sheath. The plugs force the disks against the respective ends of the reference tube to mount same. Thus the sheath 21, plugs 26 and disks 25a and 25 constitute mounting means for the tube. A slidable or floating piston plug 28 in the reference tube near the lower end thereof supports the column of reference liquid 24 filling the tube. Upon contraction of this liquid a spring 29 compressed between the lower disk and said piston plug forces same against the column of oil or reduces the effective volume of the tube 20.

While the upper disk 25a may be a sufficient seal against flow of oil and air at the upper end of the reference tube it is preferable that an additional seal in the form of a fixed plug or stopper 30 be provided.

The lower cork disk may be of sufficient porosity (since it has little chance of being wet by the liquid) to permit a passage of air into the space receiving the spring. However, due to the fact that the disk may be compacted or inherently non-porous a breather notch 31 in the lower end of the tube may be provided to assure an equalization of air pressure.

I have found the floating and fixed plugs 28 and 30 may be of chloroprene, also known to the trade as "neoprene," if the reference liquid is lubricating oil.

It is to be noted that it is preferable that the floating plug 28 be at the normally lower end of the reference tube, and the fixed plug 30 be at the upper end. Such arrangement permits the zero level of tube to be fixed definitely. Thus when the instrument is inverted the two falling bodies will be stopped by the test tube plunger 15 and the fixed stopper 30. Then upon erection of the instrument the body 22 will always begin falling from a definite zero level.

The reference tube may be completely filled to exclude air bubbles by any of the known methods, for example by carrying out the filling operation and inserting the stopper in a vacuum.

Tests over a period of many months show that the chloroprene stoppers 28 and 30 effectively prevent the loss of oil or the formation of bubbles and entrance of air within the reference liquid.

In operation, as the temperature of the reference liquid decreases and the liquid contracts the spring forces the piston 28 further into the tube to maintain substantially the same pressure on the liquid and thus prevent entrance of air into the tube. When the liquid expands due to a rise in temperature the piston is forced outwardly so that the liquid does not leak past the piston.

The invention claimed is:

1. In a viscosity meter, a sight tube closed at the upper end thereof; means for mounting the tube; a piston stopper disposed fluid tight in the lower portion of the tube and adapted to slide longitudinally therein; a liquid completely filling the tube between the stopper and the upper end; a movable body in the tube and in the liquid, and a spring compressed between the stopper and said means.

2. In a viscosity meter, a sight tube and sheath thereabout provided with a window; screw plugs threaded into each end of the sheath; resilient disks between and engaging tight against the ends of the tube and the inner faces of the plugs; stoppers disposed fluid-tight in the end portions of the tube; a spring compressed between the stopper and disk in one end portion of the tube; and a body within said tube adapted to move between the stoppers.

3. In a viscosity meter, a straight sight tube having a sheath therearound and provided with a breather notch in one end thereof; cork disks at each end of the tube and means in the ends of the sheath for holding the disks against the tube and in the sheath; solid chloroprene stoppers in the tube disposed fluid tight against the walls of the tube; a reference liquid within the tube between the stoppers and a movable body therein; and a spring compressed between the disk at the notched end of the tube and the adjacent stopper.

4. For a viscosity meter, a sight tube closed at one end; a piston having an outer end-face in the other end portion of the tube and adapted to slide fluid-tight therein; a liquid completely filling the tube between the piston and the closed end of the tube, the outer face of the piston being open to the pressure of the atmosphere; a movable body in the liquid, and resilient means for urging the piston against the liquid and having a part of said resilient means fixed with respect to the tube.

5. A viscosity meter comprising a panel adapted to be vertically disposed and provided with indicia from the top to bottom portions; a transparent reference tube on a marginal portion of the panel; a moving body and standard liquid within the reference tube, the liquid substantially filling the tube; a slidable piston plug in the reference tube near the lower end thereof; resilient means urging against said piston plug to hold same against the column of oil, said reference tube being provided with a breather notch to permit a passage of air therethrough as the slidable plug moves in response to an expansion and contraction of the standard liquid; and fixed closure means at the upper end of the reference tube and fixed with respect to said indicia and in contact with the standard liquid, said closure means being at the upper end of the tube to insure fall of the body from an initial index point when the meter is erected yet expansion of the liquid may occur and alter the position of the piston with respect to the indicia.

LOUIS C. EITZEN.

REFERENCES CITED

The following references are of record in the file of this patent:

UNITED STATES PATENTS

| Number | Name | Date |
|---|---|---|
| 1,511,998 | Larson et al. | Oct. 14, 1924 |
| 2,368,432 | Smith | Jan. 30, 1945 |